(12) United States Patent
Lacroix et al.

(10) Patent No.: US 9,973,047 B2
(45) Date of Patent: May 15, 2018

(54) DYNAMOMETER FOR A TEST STAND FOR AN AIRCRAFT TURBOMACHINE

(71) Applicant: Techspace Aero S.A., Herstal (Milmort) (BE)

(72) Inventors: Alain Lacroix, Anthisnes (BE); Quac Hung Tran, Liege (BE); Benoit Meys, Fexe-le-Haut-Clocher (BE)

(73) Assignee: Safran Aero Boosters SA (BE)

( * ) Notice: Subject to any disclaimer, the term of this patent is extended or adjusted under 35 U.S.C. 154(b) by 358 days.

(21) Appl. No.: 14/849,000

(22) Filed: Sep. 9, 2015

(65) Prior Publication Data

US 2016/0079814 A1    Mar. 17, 2016

(30) Foreign Application Priority Data

Sep. 12, 2014   (BE) .................................. 2014/0687

(51) Int. Cl.
*H02K 1/27* (2006.01)
*H02K 1/32* (2006.01)
(Continued)

(52) U.S. Cl.
CPC ............. *H02K 1/2766* (2013.01); *H02K 1/32* (2013.01); *H02K 7/088* (2013.01); *H02K 7/1823* (2013.01); *H02K 9/06* (2013.01)

(58) Field of Classification Search
CPC ............ H02K 1/20; H02K 1/27; H02K 1/276; H02K 1/2766; H02K 1/278; H02K 1/28;
(Continued)

(56) References Cited

U.S. PATENT DOCUMENTS 4,296,544 A * 10/1981 Burgmeier ............. H02K 1/278
29/598
4,788,855 A * 12/1988 Laskody ................. G01L 5/133
73/112.04
(Continued)

FOREIGN PATENT DOCUMENTS

CN    102338678 A  *  2/2012
EP       1953896 A1      8/2008
(Continued)

OTHER PUBLICATIONS

European Search Report from corresponding Belgium Application No. BE 201400687, dated Jun. 3, 2015.

*Primary Examiner* — Tran Nguyen
(74) *Attorney, Agent, or Firm* — Sandberg Phoenix & von Gontard PC

(57) ABSTRACT

The invention relates to a rotating electric machine, such as a dynamometer. The rotor of the machine comprises a circular row of resultant magnetic poles of which the polarity forms an alternation of opposed poles. The resultant poles each include a pair of permanent magnets in a "V", each equipped with a north pole N, a south pole S, and opposed faces, where the magnet poles are located. In each resultant pole the magnets are disposed so as to have faces having identical polarities, which faces are oriented radially outwardly, facing towards one another, thus forming therebetween an angle β between 90° and 110°, which makes it possible to increase the efficiency. The invention also relates to a turbomachine test stand equipped with a dynamometer enabling a recovery of electrical energy. The invention also relates to a hybrid motor vehicle propelled by the rotating electric machine.

19 Claims, 4 Drawing Sheets

(51) Int. Cl.
*H02K 9/06* (2006.01)
*H02K 7/08* (2006.01)
*H02K 7/18* (2006.01)

(58) Field of Classification Search
CPC .. H02K 1/32; H02K 7/00; H02K 7/08; H02K 7/088; H02K 7/18; H02K 7/182; H02K 7/1823; H02K 9/00; H02K 9/06; H02K 9/19
See application file for complete search history.

(56) References Cited

U.S. PATENT DOCUMENTS

| | | | | |
|---|---|---|---|---|
| 5,986,545 A * | 11/1999 | Sanada | ............. | G01M 17/00 340/407.1 |
| 6,445,100 B2 * | 9/2002 | Tajima | ............. | H02K 1/276 310/12.13 |
| 6,525,442 B2 * | 2/2003 | Koharagi | ............. | H02K 1/2766 310/156.45 |
| 7,151,335 B2 * | 12/2006 | Tajima | ............. | H02K 1/2766 310/156.48 |
| 7,385,328 B2 * | 6/2008 | Melfi | ............. | H02K 1/278 310/156.45 |
| 7,436,096 B2 * | 10/2008 | Guven | ............. | H02K 1/2766 310/156.53 |
| 2007/0126305 A1 * | 6/2007 | Okuma | ............. | H02K 1/276 310/156.53 |
| 2008/0185196 A1 * | 8/2008 | Artioli | ............. | B60K 6/46 180/65.245 |
| 2010/0244609 A1 * | 9/2010 | Takahata | ............. | H02K 1/276 310/156.53 |
| 2013/0020889 A1 | 1/2013 | Yamamoto et al. | | |

FOREIGN PATENT DOCUMENTS

| | | |
|---|---|---|
| GB | 2484386 A | 4/2012 |
| JP | 2003174747 | 6/2003 |

* cited by examiner

DYNAMOMETER FOR A TEST STAND FOR AN AIRCRAFT TURBOMACHINE

CROSS-REFERENCE TO RELATED APPLICATIONS

This application claims the benefit, under 35 U.S.C. § 119, of BE 2014/0687, filed Sep. 12, 2014, the disclosure of which is incorporated herein by reference in its entirety.

FIELD

The invention relates to a rotating electric machine. More particularly, the invention relates to an electric machine comprising a rotor with resultant magnetic poles formed by pairs of magnets disposed in a "V". The invention also relates to a test stand for a turbomachine with a dynamometer formed by a rotating electric machine. The invention also relates to a motor vehicle propelled by a rotating electric machine.

BACKGROUND

The design or maintenance of an aircraft turbomachine requires a series of tests to be performed with a view to validating the turbomachine. These tests are performed on the ground in installations making it possible to simulate different flight conditions. A number of operating modes of the turbomachine are studied by changing certain parameters in turn. These tests last for long phases, during which the turbomachine generates a thrust dissipated into the environment.

In view of energy-saving and environmental considerations, it is expedient to recover some of the mechanical energy produced by the turbomachine. This recovery is made with the aid of a rotating electric machine. Due to the power of a turbomachine installed in an aircraft, for example a long-haul model, a substantial amount of energy can be recovered and injected into an electrical grid.

Document JP2003-174747 A discloses a dynamometer that generates electrical current. The dynamometer comprises a rotor with magnetic poles formed by pairs of plate-shaped magnets. The magnets are disposed in a "V" by placing two identical poles opposite one another facing towards one another. This configuration optimizes the efficiency of the dynamometer whilst taking into account the concentrations of constraints associated with the centrifugal force. However, the possibilities for recovering energy remain limited.

SUMMARY

An object of the invention is to overcome at least one of the problems posed by the prior art. More precisely, an object of the invention is to improve the efficiency of a rotating electric machine. A further object of the invention is to optimize the efficiency and the resistance to the centrifugal force. Another object of the invention is to recover more energy on a test stand. A further objective of the invention is to reduce the energy necessary for the propulsion of a motor vehicle.

The invention relates to a rotating electric machine comprising a stator and a rotor, which has a circular row of resultant magnetic poles of which the polarities form an alternation of opposed magnetic poles; each resultant pole includes a pair of permanent magnets, each magnet having two opposed faces and two opposed poles each located on one of the opposed faces of the magnet; in each resultant pole the magnets are disposed so as to have faces having poles of identical polarities, which faces are oriented radially outwardly and facing towards one another, the combination of the poles determining the polarity of the resultant pole; the rotating electric machine being noteworthy in that in each resultant pole the outwardly oriented faces of magnets of identical polarities form, therebetween, an angle β between 90° and 110°.

In accordance with various embodiments of the invention the angle β is between 95° and 105°, e.g., between 98° and 102°, the angle β possibly being equal to 100°.

In accordance with various embodiments of the invention the rotor comprises a stack of magnetic sheets in which the magnets are inserted, and the rotor comprises eight resultant magnetic poles and sixteen magnets.

In accordance with various embodiments of the invention the machine comprises a hydrodynamic damper, and the rotor, in various embodiments, forms a cylindrical body of which the outer surface has one or more dimples forming hydrodynamic dampers, the dimples forming at least one circular row of dimples configured to ensure a concentricity between the stator and the rotor.

In accordance with various embodiments of the invention at least one or each dimple comprises a profile, in a plane perpendicular to the axis of rotation, with a portion generally tangential to the outer surface of the rotor, and a portion extending primarily radially.

In accordance with various embodiments of the invention, the dimples are disposed circumferentially between the resultant poles of the rotor.

In accordance with various embodiments the radial depth of at least one or each dimple is between 0.1 mm and 10 mm, e.g., between 0.2 mm and 0.4 mm.

In accordance with various embodiments of the invention the rotor comprises a first set of axial cooling channels disposed between the magnets of each resultant pole, the first channels being accommodated in an annular zone delimited radially by the radial height of the magnets.

In accordance with various embodiments of the invention the first channels are cylindrical, and a distance D1 between the outer surface of the rotor and each first channel is greater than or equal to a distance D2 between each first channel and each associated magnet, the diameter of the channels being less than the width, in various implementations less than half the width, of the outwardly oriented faces of magnets having poles of identical polarities.

In accordance with various embodiments of the invention, the rotor comprises second axial cooling channels, the axis of rotation being radially closer to the second channels than to the magnets.

In accordance with various embodiments of the invention the rotor comprises a centrifugal fan with radial blades configured to drive a circulation of air through each cooling channel.

In accordance with various embodiments of the invention the magnets occupy, angularly, the majority of the circumference of the rotor. In various embodiments, the magnets cover the majority of the circumferential extension of each channel of at least one set of channels, e.g., of each set of channels.

In accordance with various embodiments of the invention the rotor comprises as many resultant poles as channels in each set of cooling channels.

In accordance with various embodiments of the invention the stator comprises a polyphased winding and magnetic sheets stacked in the direction of the axis of rotation of the rotor.

In accordance with various embodiments of the invention at least one or each dimple is longer in the direction of the circumference of the rotor than wide in the direction of the axis of rotation.

In accordance with various embodiments of the invention the inner surface of the stator forms a radial toothing that is variable over the circumference thereof.

In accordance with various embodiments of the invention the stator comprises a cooling device with conduits around the stator.

The invention also relates to a dynamometer comprising a rotating electric machine, wherein the rotating electric machine is formed in accordance with the invention.

The invention also relates to a test stand for an engine, in particular for a turbomachine having at least two flows, the test stand comprising a zone for receiving an engine to be tested and a dynamometer intended to be connected to the engine to be tested, noteworthy in that the dynamometer is formed in accordance with the invention.

In accordance with various embodiments of the invention the stand comprises a control unit configured to control the resistive torque exerted by the dynamometer.

In accordance with various embodiments of the invention the stand comprises a torque gauge connected to the dynamometer and, in various implementations, connected to the control unit so as to measure the resistive torque that the dynamometer opposes to the turbomachine.

In accordance with various embodiments of the invention the stand comprises a frequency converter, in particular a four-quadrant frequency converter, connected to the dynamometer.

In accordance with various embodiments of the invention the test stand comprises a torque gauge connected to the dynamometer and connected to the control unit so as to measure the resistive torque that the dynamometer opposes to the turbomachine. In various implementations the test stand can comprise a flywheel connected to the dynamometer.

The invention also relates to a motor vehicle comprising an electric motor comprising a rotating electric machine configured to propel the vehicle, wherein the rotating electric machine is formed in accordance with the invention.

In accordance with various embodiments of the invention the vehicle also comprises a heat engine and a battery connected to the rotating electric machine, the heat engine being configured so as to be able to propel the vehicle and recharge the battery, the electric machine can be configured to recharge the battery.

In accordance with various embodiments of the invention the electric machine is configured so as to be able to recharge the battery.

The invention makes it possible to improve the efficiency of a rotating electric machine by increasing the flow passing through the air gap whilst limiting heating. The flow gain is obtained due to the orientation of the magnets and due to the reduction of the air gap, which is permitted by the design of the dimples.

This compact configuration is particularly effective for producing electrical energy in spite of the powers at play, more particularly at speeds of rotation of approximately 7500 rpm for a turbomachine of an airplane. The orientation of the magnets also makes it possible to reach a compromise between the parameters associated with the efficiency of the rotating electric machine and the mechanical strength in spite of the magnitude of the centrifugal force.

DETAILED DESCRIPTION

In the following description the terms inside or inner and outside or outer relate to a positioning with respect to the axis of rotation of the test stand or of the electric machine. The axial direction is along the axis of rotation.

Figure 1:
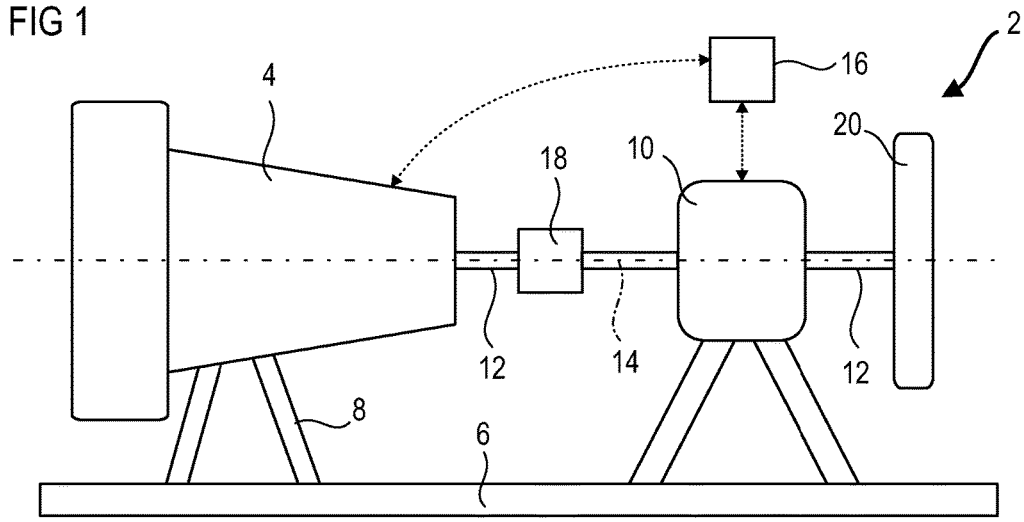
FIG. 1 shows a test stand for a turbomachine in accordance with various embodiments of the invention.

FIG. 1 shows, in a simplified manner, a test stand 2 for an engine 4, in particular for an aircraft turbomachine 4.

The test stand 2 rests on a support 6 to which the different entities are connected. The test stand 2 comprises a receiving zone for the turbomachine 4, with connections 8 for fixing the turbomachine to the support 6. It also comprises a dynamometer 10, which exerts a resistive torque onto the turbomachine 4 via a transmission shaft 12 rotating about the common axis of rotation 14. The dynamometer 10 comprises a rotating electric machine and a display allowing a user to read the power recovered by the dynamometer 10. The stand 2 can comprise a programmable control unit 16 structured and operable to control the turbomachine 4 and the dynamometer 10 so as to vary the resistive torque in accordance with programmed tests. The variation of the resistive torque is implemented by modifying the electrical load connected to the dynamometer when the dynamometer is operating as a generator. The control unit 16 is additionally used as a user interface and can be the display of the dynamometer.

During the operation of the turbomachine 4, the dynamometer 10 converts the mechanical energy of the turbomachine 4 into electrical energy, and the power of the turbomachine can produce more than 1,000 kW via the dynamometer. This energy is either stored or reinjected into an electrical grid (not shown), to which the dynamometer is connected. A four-quadrant frequency converter operating within ranges extending up to 500 Hz can be utilized to adapt the frequency of the current produced to the needs of the grid. In various embodiments, the dynamometer 10 can be supplied such that it behaves similarly to an engine, for example so as to drive the turbomachine 4.

The dynamometer 10 can be connected directly to the engine shaft, and in various implementations, to the primary shaft of the turbomachine. For the needs of the test, a blower of the turbomachine 4 can be dismantled, which increases the electrical energy produced. The speed of rotation of the dynamometer 10 can be greater than 5,000 rpm, e.g., greater than 10,000 rpm. In addition, the test stand 2 can have a torque sensor 18 on the transmission shaft 12 in order to control the resistive torque of the dynamometer 10, and a flywheel 20. The control unit 16 can also collect, record, and process measurements of the temperatures, the speeds of rotation, the recovered power, the torque, and the vibrations.

Figure 2:
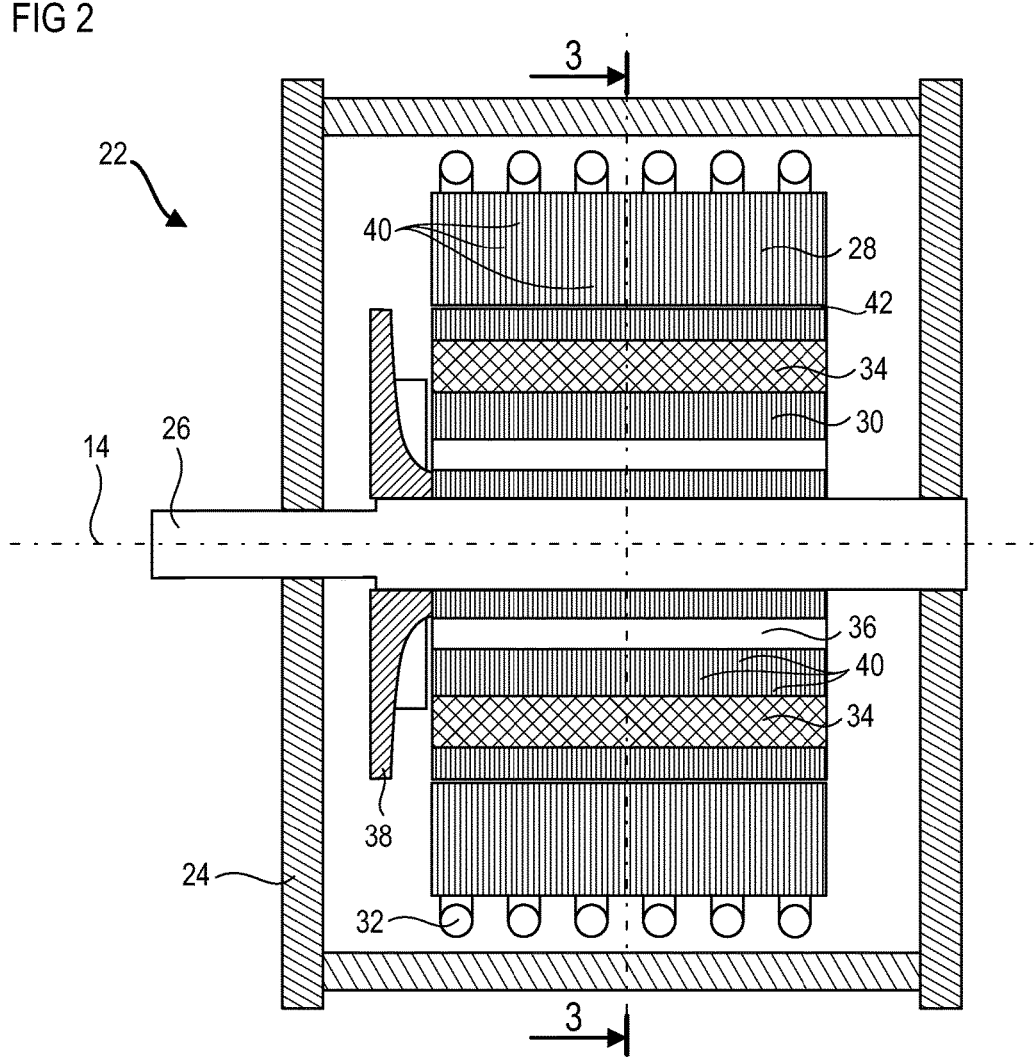
FIG. 2 shows a section of a rotating electric machine in accordance with various embodiments of the invention.

FIG. 2 is a sectional view of a rotating electric machine 22, such as the dynamometer of FIG. 1. The rotating electric machine 22 can operate in both directions of rotation.

The rotating electric machine 22 can comprise an outer casing 24 and a shaft 26 intended to be connected to the engine. The machine 22 comprises a stator 28 secured to the casing 24 and a rotor 30 secured to the shaft 26 and rotating within the stator about the axis of rotation 14. The stator 28 can have an annular shape, such as a tube, which delimits a cylindrical space in which the cylindrical rotor 30 is placed. The stator 28 can comprise a cooling system with pipes 32 transporting a cooling fluid. The electric machine 22 being of the type with multipolar alternating current, the stator 28 thereof has a polyphased winding.

The rotor 30 can comprise permanent magnets 34, which can have plate shapes extending over the entire axial length of the rotor 30. Each plate, and therefore each magnet 34, has opposed primary faces over the thickness of the plate. The primary faces are the largest faces and can be parallel.

The rotor 30 can also comprise sets of cooling channels 36 extending axially along the entire length of the rotor 30. The channels 36 of the same set are disposed at the same radial height with respect to the axis of rotation 14. A radial fan 38 can be placed on one of the axial sides of the rotor in order to drive the air through the cooling channels 36.

The rotor 30 and the stator 28 can each be formed of an axial stack of magnetic or ferromagnetic sheets 40, which make it possible to create a magnetic circuit. Slots and openings are formed in the sheets of the rotor in order to insert there the magnets 34 and in order to delimit the cooling channels 36. The magnetic fields of the magnets lead into the ferromagnetic sheets of the rotor and of the stator, which form the magnetic circuit. The annular space between the stator and the rotor forms an air gap 42 in the circuit.

Figure 3:
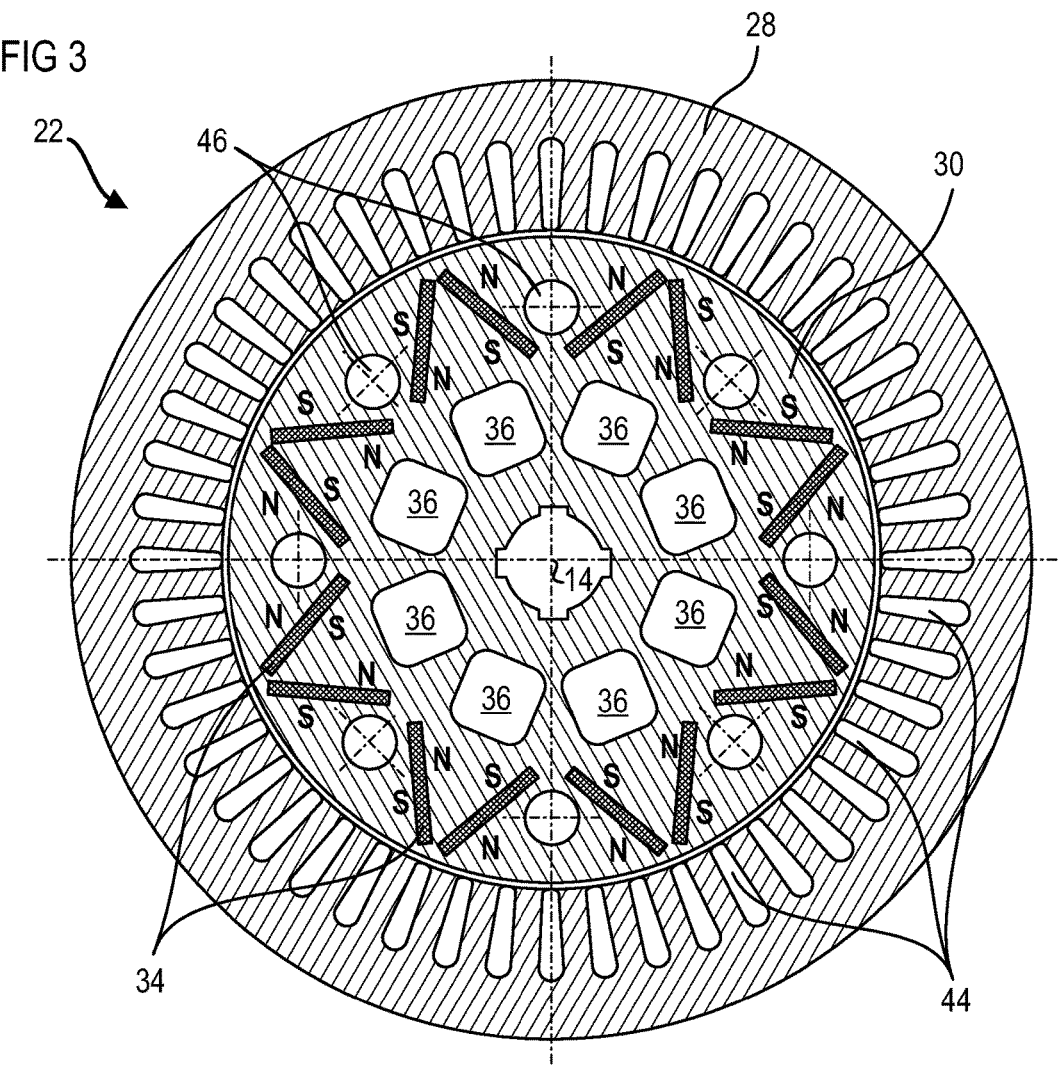
FIG. 3 illustrates a section of the rotor and of the stator of the rotating electric machine along the axis 3-3 indicated in FIG. 2, in accordance with various embodiments of the invention.

FIG. 3 sketches a section along the axis 3-3 indicated in FIG. 2 of the rotor 30 and of the stator 28 of the electric machine.

The stator 28 has notches 44 or teeth 44 so as to place there cogwheels (not shown); as the rotor 30 rotates, the passage of the magnets 34 of the rotor make it possible to create electrical current in the coils with a view to producing recoverable energy.

Each permanent magnet 34 comprises a north pole N and a south pole S; each of these poles being arranged on one of the primary faces of the magnets. The magnets 34 are associated by pairs, the magnets 34 of each pair having outer faces with poles with identical polarities (N, S), i.e. with identical names. The combination of each pair of magnets 34 and of the ferromagnetic material of the rotor 30 forms a resultant magnetic pole of identical polarity as the poles of the outer faces of the magnets 34 of the pair. The set of magnets 34 forms an alternation of polarities of resultant magnetic poles over the revolution of the rotor 30. The alternation of polarities (N, S) is provided from one pair of magnets to the next, the neighboring side being considered over the circumference of the rotor. In the present case the rotor 30 has four resultant north poles between which four resultant south poles are placed in alternation.

The magnets 34 are oriented in a manner inclined with respect to the radial direction and the circumferential direction. The magnets 34 each have an inner face facing towards the axis of rotation 14 and an outer face facing towards the outside of the rotor, the faces being planar.

The rotor 30 comprises at least one first set of cooling channels 46 and a second set of cooling channels 36, each set for example comprising eight channels. The first channels 46 can have a cylindrical form. The second channels 36 can have a rectangular or generally squared profile. The middles, over the circumference, of the channels of one set of channels (36, 46) are offset angularly with respect to the middles, over the circumference, of the channels of the other set.

Figure 4:
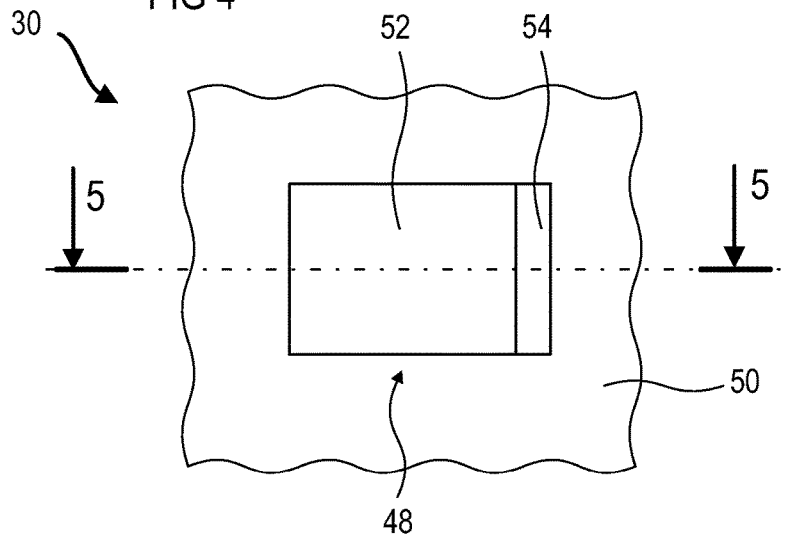
FIG. 4 shows a draft of a plan view of a dimple of the rotor in accordance with various embodiments of the invention.

FIG. 4 shows a dimple 48 formed on the outer surface 50 of the rotor 30.

The electric machine 22 can comprise a hydrodynamic damper. This damper can be formed on the stator and/or on the rotor 30. The latter can comprise dimples 48, or bulges, for example arranged in a number of annular rows. At least one or each dimple 48 can form a rectangular imprint in two portions (52, 54) inclined with respect to the outer surface 50 of the rotor 30. The dimple 48 is delimited axially by radial flanks.

Figure 5:
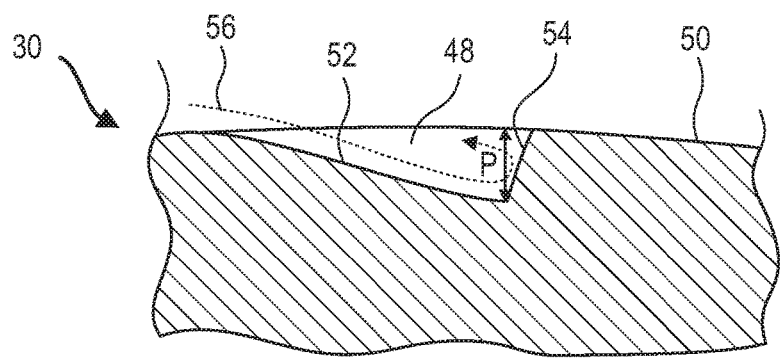
FIG. 5 shows a sketch of a section along the axis 5-5 indicated in FIG. 4 of a dimple, in accordance with various embodiments of the invention.

FIG. 5 drafts a section of a dimple 48 along the axis 5-5 indicated in FIG. 4.

The first portion 52 is generally tangential, over the circumference, to the outer surface 50 of the rotor 30, and the second portion 54 generally extends radially. During the rotation, the air flows 56 in the dimple 48 along the first portion 52 then contacts the second portion 54, which increases the pressure. In this way, cushions of air form and make it possible to center the rotor 30 with respect to the stator 28, which allows a reduction of the air gap 42 during the design. This feature increases the efficiency of the electric machine by limiting magnetic losses. The depth P of the dimples can be between 0.1 mm and 10 mm, e.g., between 0.2 mm and 0.4 mm. These values are beneficial for rotors 30 with outer diameters between 10 cm and 60 cm, e.g., between 25 cm and 40 cm.

In accordance with various embodiments, the two portions of the profile of the imprint can be arcs of circles forming concave recesses. The junction of the portions forms an inflection, and the two portions can be symmetrical so as to allow operation in the two directions of rotation.

Figure 6:
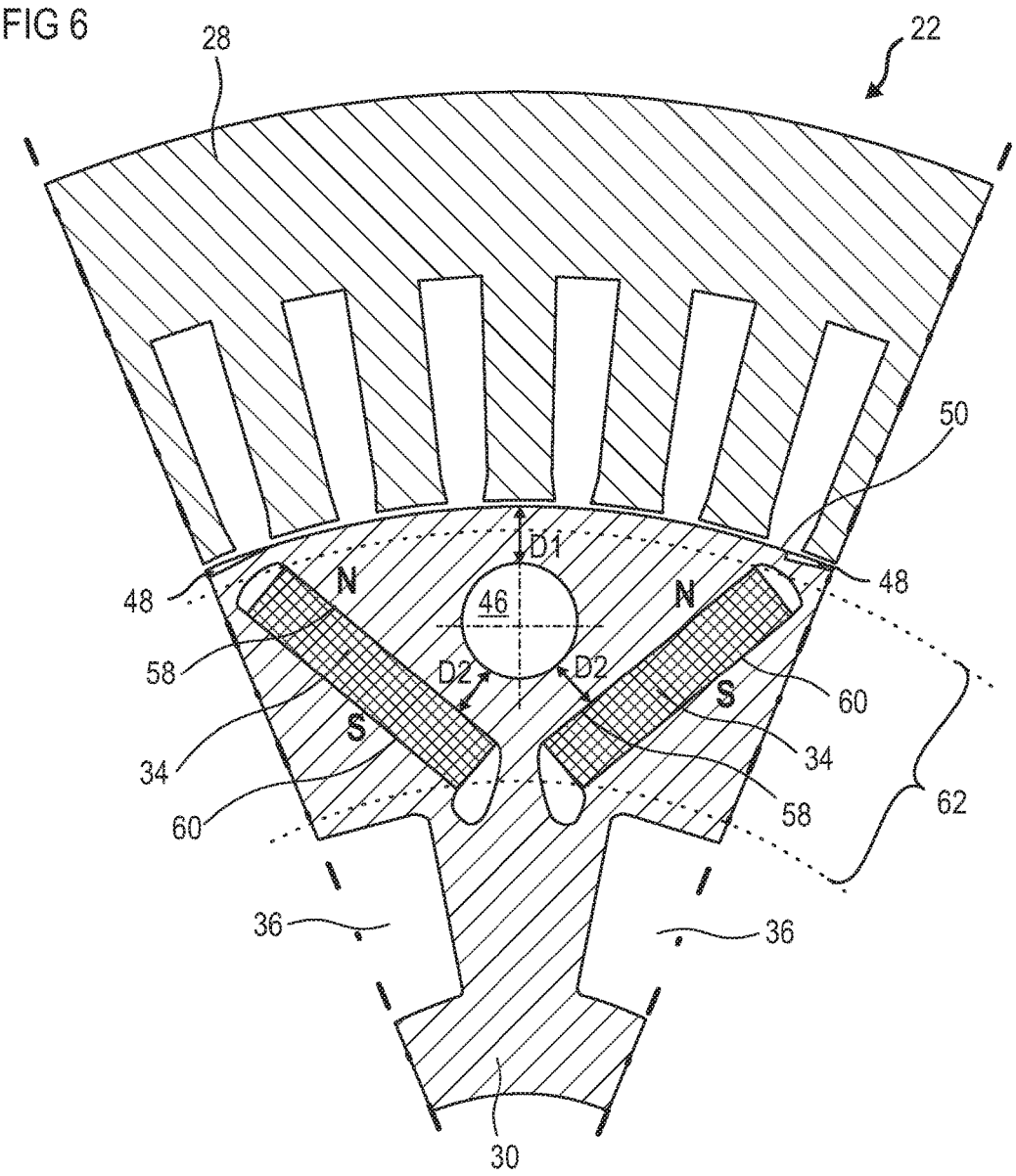
FIG. 6 shows an angular portion of the rotor and stator of the electric machine in accordance with various embodiments of the invention.

FIG. 6 shows an enlargement of an angular portion representative of the rotor 30 and of the stator 28 of the electric machine 22. The angular portion shows a resultant north pole, which results from the combination of a pair of magnets 34 with north poles N towards the outside.

The, or each, first channel 46 is at the radial height of the magnets 34 and is placed facing towards outer faces 58 of the magnets 34. The second channels 36 are disposed facing towards inner faces 60 of the magnets 34. During the rotation of the rotor 30, the magnets 34 sweep over an annular zone 62; the first channels 46 being disposed in the radial thickness of the annular zone 62, and the second channels 36 being enveloped by the annular zone at 62. The magnets 34 straddle, at least largely, each channel over the circumference.

The distance between the axis of rotation and any point of the first channels 46 is comprised in the distance interval between the axis of rotation and any point of the magnets 34. The maximum distance between the second channels 36 and the axis of rotation is less than the minimum distance between the first channels 46 and the axis of rotation. The distances considered are radial distances. The channels make it possible to cool the rotor and avoid a rise in temperature of the magnets so that they maintain their magnetic properties, in order to preserve the efficiency of the electric machine 22.

The, or each, first channel 46 can be closer to the magnets 34 than to the outer surface 50 of the rotor 30 in order to better cool the magnets 34, but still with the objective of preserving the performance of the machine. A distance D1 between the outer surface 50 of the rotor 30 and the first channel 46 is greater than a distance D2 between the first channel 46 and the magnets 36. In addition, the diameter of the first channel 46 can be less than the width or half of the width of the face 58 of the magnet 34 arranged opposite, with the objective of preserving the section of the magnetic circuit between the magnets and the outer surface of the rotor. The width is measured transversely with respect to the axis of rotation.

The dimples 48 are disposed over the circumference at outer peaks of the magnets 34, in particular between magnets 34 of which the orientation of the poles is asymmetrical. The dimples 48 can be disposed between the resultant poles.

Figure 7:
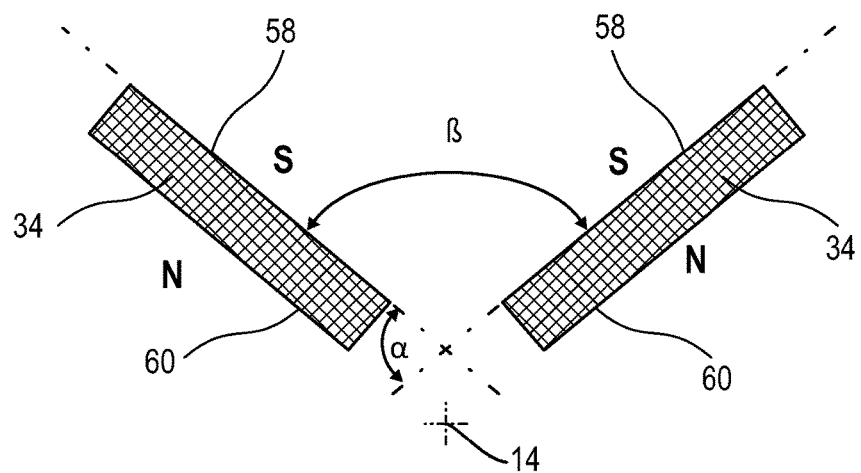
FIG. 7 illustrates a magnet pair with a resultant magnetic pole in accordance with various embodiments of the invention.

FIG. 7 shows a pair of magnets 34 with a resultant south magnetic pole. In the present case the south poles S are oriented outwardly with respect to the axis of rotation 14 and face towards one another.

The magnets 34 of each resultant pole are inclined with respect to one another, in various implementations, symmetrically with respect to an axial plane passing through the axis of rotation 14. The outer faces 58 where poles with the same name are located describe an angle β between 90° and 110°, e.g., between 95° and 105°, e.g., between 98° and 102°. In various embodiments, the angle β can be equal to 100°. This orientation of faces (58, 60) improves the efficiency of the electric machine. A dynamometer of this design will have an increased efficiency of electrical energy production. An electric motor corresponding to this design will offer more mechanical work when it is supplied with power.

One of the magnets 34 of each magnetic pole is turned with respect to the plane of the outer face 58 of the other magnet. Thus, the outer faces 58 of the magnets of the resultant pole are inclined with respect to one another by an angle α between 70° and 90°, e.g., the angle α can be equal to 80°. Each magnet has a mean plane over the thickness thereof, these planes being inclined by the angle α. The outer faces 58 of at least one or each resultant pole have straight lines normal to their respective surfaces, which are inclined with respect to one another by the angle α.

The operation of the electric machine applies to wind turbines for producing energy. The invention also applies to engines of industrial machines thanks to the available torque.

Figure 8:
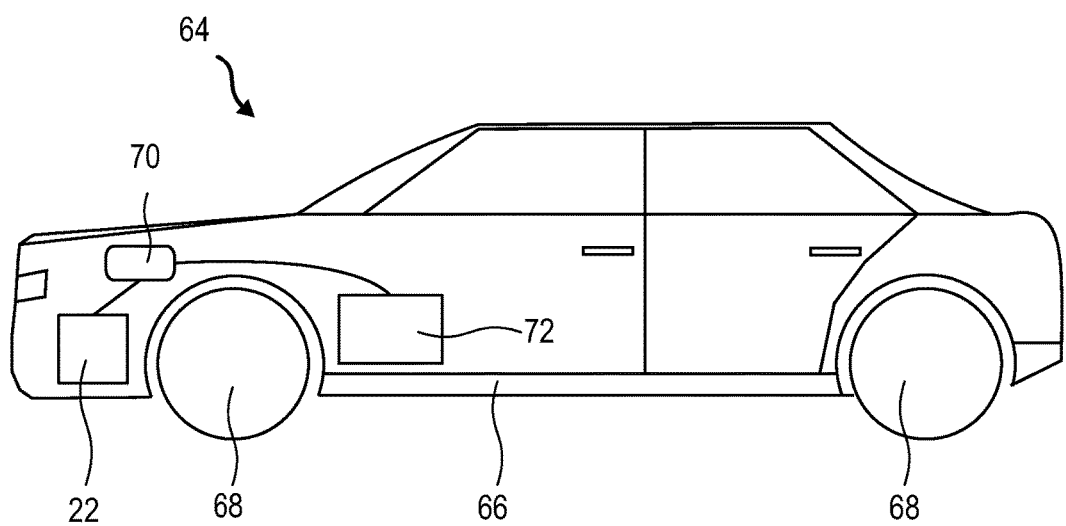
FIG. 8 shows a draft of an electrically propelled vehicle in accordance with various embodiments of the invention.

FIG. 8 shows a motor vehicle 64 with a rotating electric machine 22 such as that described above with regard to the previous figures.

The vehicle 22 comprises a chassis 66 and wheels 68, of which some are motor-driven. The vehicle 64 is propelled by a rotating electric machine 22, which can be an electric motor 22. The vehicle 64 can comprise a battery 70 for providing electrical energy to the electric machine 22. This mode of propulsion makes it possible to reduce the energy necessary to propel the vehicle due to the efficiency of the electric machine 22, the battery 70 being able to be recharged by an external source.

In addition, the vehicle 64 can comprise a heat engine 72, i.e. operating with the aid of a fuel. The heat engine 72 is also configured to propel the vehicle 64. The heat engine 72 can comprise an alternator for recharging the battery 70, just as the electric machine 22 can be. The latter case can be provided in a braking phase or when the torque delivered by the heat engine is greater than needed. The vehicle offers a hybrid propulsion mode, which makes it possible to reduce the consumption thereof whilst offering increased total power.

The electric machine can also be used as a boat engine.

The invention claimed is:

1. A rotating electric machine, said rotating electric machine comprising:
a stator; and
a rotor comprising a circular row of resultant magnetic poles of which the polarities form an alternation of opposed magnetic poles, each resultant magnetic pole comprising a pair of permanent magnets, each permanent magnet comprising two opposed faces and two opposed poles (N, S), each pole located on one of the opposed faces of the permanent magnet, wherein:
in each resultant magnetic pole the permanent magnets are disposed so as to have mechanical faces having poles (N, S) of identical polarities oriented radially outwardly and facing towards one another, the combination of the identical poles determining the polarity of the resultant magnetic pole; and
in each resultant magnetic pole the outwardly oriented faces of the opposed faces of permanent magnets of identical polarities form, therebetween, a mechanical angle β between 95° and 105°.

2. The rotating electric machine in accordance with claim 1, wherein the rotor comprises a stack of magnetic sheets in which the permanent magnets are inserted, and the rotor comprises eight resultant magnetic poles and sixteen permanent magnets.

3. The rotating electric machine in accordance with claim 1, wherein the rotor forms a cylindrical body of which the outer surface has at least one dimples forming hydrodynamic dampers.

4. The rotating electric machine in accordance with claim 3, wherein the dimples are arranged in at least one circular row of dimples.

5. The rotating electric machine in accordance with claim 3, wherein at least one dimple comprises a profile, in a plane perpendicular to the axis of rotation, with a portion generally tangential to the outer surface of the rotor, and a portion mainly extending radially.

6. The rotating electric machine in accordance with claim 3, wherein the dimples are disposed circumferentially between the resultant magnetic poles of the rotor.

7. The rotating electric machine in accordance with claim 3, wherein a radial depth of at least one dimple is between 0.1 mm and 10 mm.

8. The rotating electric machine in accordance with claim 1, wherein the rotor comprises a first set of axial cooling channels disposed between the permanent magnets of each resultant magnetic pole, the first channels being placed in an annular zone delimited radially by the radial height of the permanent magnets.

9. The rotating electric machine in accordance with claim 8, wherein the first cooling channels are cylindrical, and a distance D1 between the outer surface of the rotor and each first cooling channel is at least greater than a distance D2 between each first cooling channel and each associated permanent magnet, the diameter of the first cooling channels being less than the width of the outwardly oriented faces of permanent magnets having resultant magnetic poles of identical polarities.

10. The rotating electric machine in accordance with claim 1, wherein the rotor comprises axial cooling channels and a centrifugal fan with radial blades configured to drive a circulation of air through each axial cooling channel.

11. The rotating electric machine in accordance with claim 8, wherein the rotor comprises a second set of axial cooling channels, an axis of rotation of the rotor being radially closer to the second channels than to the permanent magnets.

12. The rotating electric machine in accordance with claim 1, wherein the permanent magnets occupy, angularly, at least a half of a circumference of the rotor.

13. A test stand for an engine with a rotating shaft, said test stand comprising:
 a zone for receiving an engine to be tested; and
 a dynamometer linked to the engine to be tested, wherein the dynamometer includes a rotating electric machine, the rotating electric machine comprises:
 a stator; and
 a rotor intended to be driven by the engine's rotating shaft, the rotor comprising a circular row of resultant magnetic poles of which the polarities form an alternation of opposed magnetic poles, each resultant magnetic pole comprising a pair of permanent magnets, each permanent magnet comprising two opposed faces and two opposed poles (N, S), each pole located on one of the opposed faces of the permanent magnet, wherein:
  in each resultant magnetic pole the permanent magnets are disposed so as to have opposed faces having poles (N, S) of identical polarities oriented radially outwardly and facing towards one another, the combination of the magnetic poles determining the polarity of the resultant magnetic pole; and
  in each resultant magnetic pole the outwardly oriented faces of the opposed faces of permanent magnets of identical polarities form, therebetween, a mechanical angle β equal to 100°, and the rotor comprises eight resultant magnetic poles.

14. The test stand in accordance with claim 13, wherein the engine is a double flow turbofan engine.

15. The test stand in accordance with claim 13, further comprising a control unit configured to control a resistive torque exerted by the dynamometer.

16. The test stand in accordance with claim 15, further comprising a torque gauge connected to the dynamometer and connected to the control unit so as to measure the resistive torque that the dynamometer opposes to the turbomachine.

17. The test stand in accordance with claim 13, further comprising a four-quadrant frequency converter connected to the dynamometer.

18. A motor vehicle, said vehicle comprising:
 a rotating electric machine forming an electric motor configured to propel the vehicle, the rotating electric machine comprising:
 a stator; and
 a rotor comprising a circular row of resultant magnetic poles of which the polarities form an alternation of opposed magnetic poles, each resultant magnetic pole comprising a pair of permanent magnets, each permanent magnet comprising two opposed faces and two opposed poles (N, S) each pole located on one of the opposed faces of the permanent magnet, wherein:
  in each resultant magnetic pole the permanent magnets are disposed so as to have faces having poles (N, S) of identical polarities oriented radially outwardly and facing towards one another, the combination of the identical poles determining the polarity of the resultant magnetic pole; and
  in each resultant magnetic pole outwardly oriented faces of the opposed faces of permanent magnets of identical polarities form, therebetween, a mechanical angle β between 90° and 110°, and the rotor comprises a set of cylindrical axial cooling channels disposed between the permanent magnets of each resultant magnetic pole, and
 a distance D1 between the outer surface and each cylindrical axial cooling channel is at least greater than a distance D2 between each cylindrical axial cooling channel and each associated permanent magnet.

19. The motor vehicle in accordance with claim 18, further comprising a combustion engine and a battery connected to the rotating electric machine, the combustion engine being configured to propel the vehicle and to reload the battery, the electric machine being configured to recharge the battery.

* * * * *